United States Patent [19]

Horstman

[11] 4,358,885
[45] Nov. 16, 1982

[54] METHOD OF REMOVING AND REINSTALLING BOTTOM ENTERING AGITATOR SEALS

[75] Inventor: Jerry L. Horstman, Aberdeen, Miss.

[73] Assignee: Conoco Inc., Ponca City, Okla.

[21] Appl. No.: 234,734

[22] Filed: Feb. 17, 1981

[51] Int. Cl.³ .............................................. B23P 19/02
[52] U.S. Cl. ...................................... 29/426.5; 29/252; 29/282
[58] Field of Search ..................... 29/426.5, 252, 263, 29/259, 282

[56] References Cited

U.S. PATENT DOCUMENTS

| | | | |
|---|---|---|---|
| 2,085,529 | 6/1937 | Heimbach et al. | 29/263 |
| 3,124,870 | 3/1964 | Hugosen | 29/256 |
| 3,174,218 | 3/1965 | McConahe | 29/263 X |
| 4,129,931 | 12/1978 | Carrigan | 29/252 |
| 4,150,477 | 4/1979 | Orr | 29/252 X |

Primary Examiner—Leon Gilden
Attorney, Agent, or Firm—William J. Miller

[57] ABSTRACT

An improved method of removing and reinstalling a seal unit from a process vessel bottom entering agitator assembly wherein a jack is connected in the assembly and used to lower and raise the seal unit, agitator shaft and agitator connected thereto, whereby the agitator shaft and agitator are temporarily connected to the vessel and the seal unit is removed and reinstalled.

4 Claims, 7 Drawing Figures

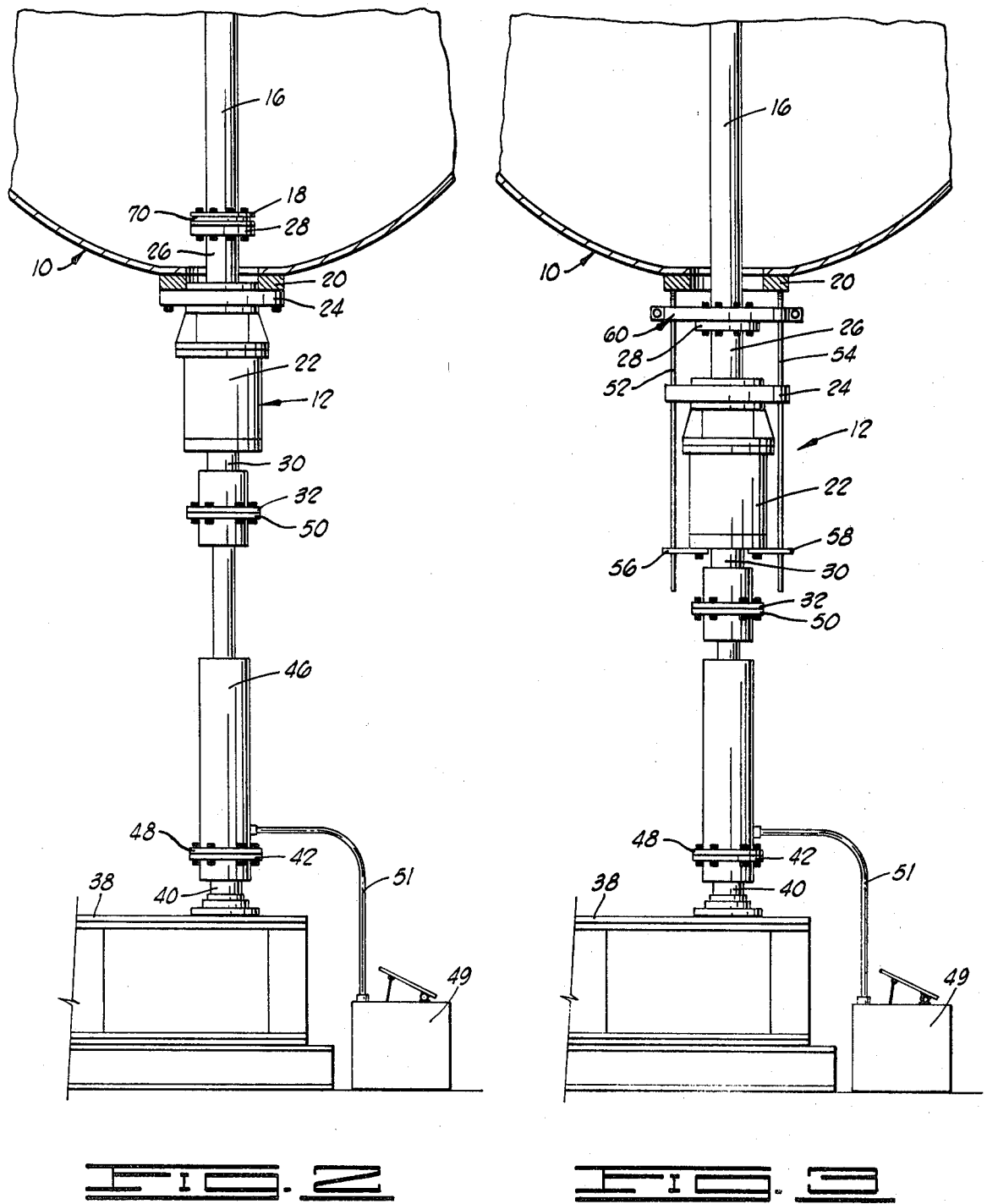

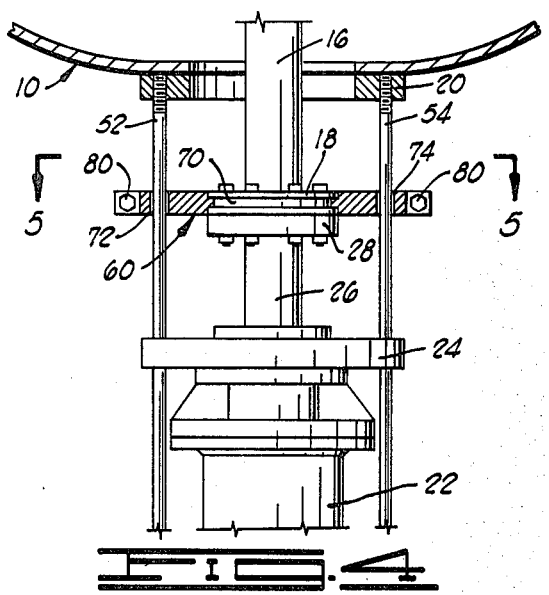
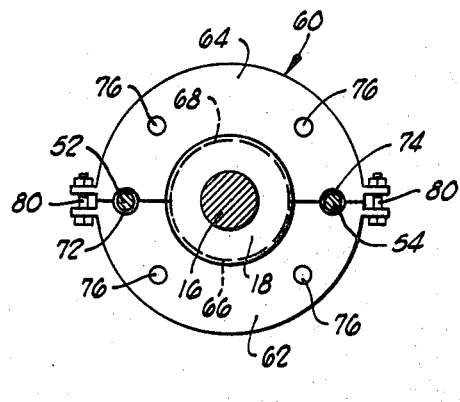
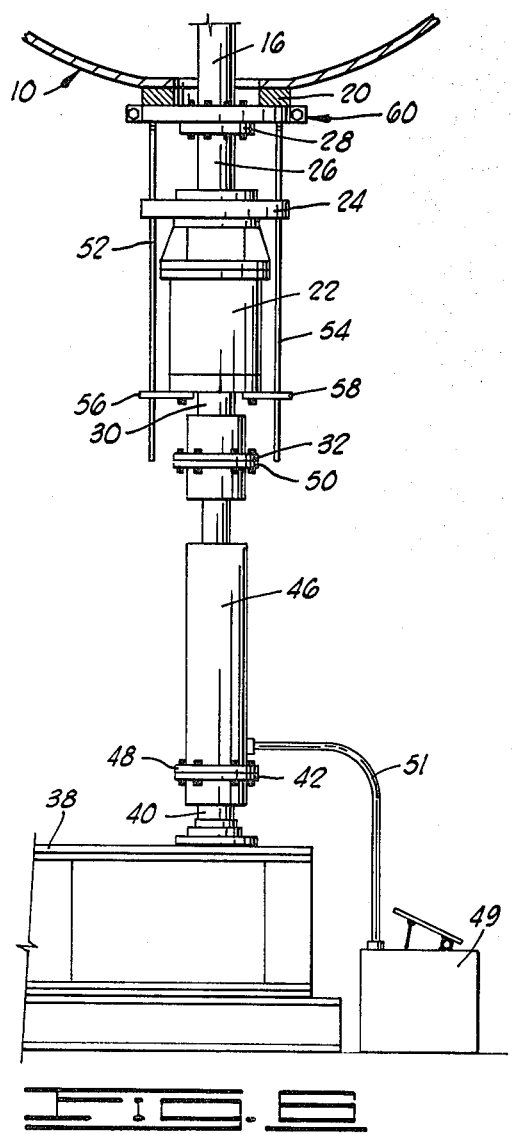
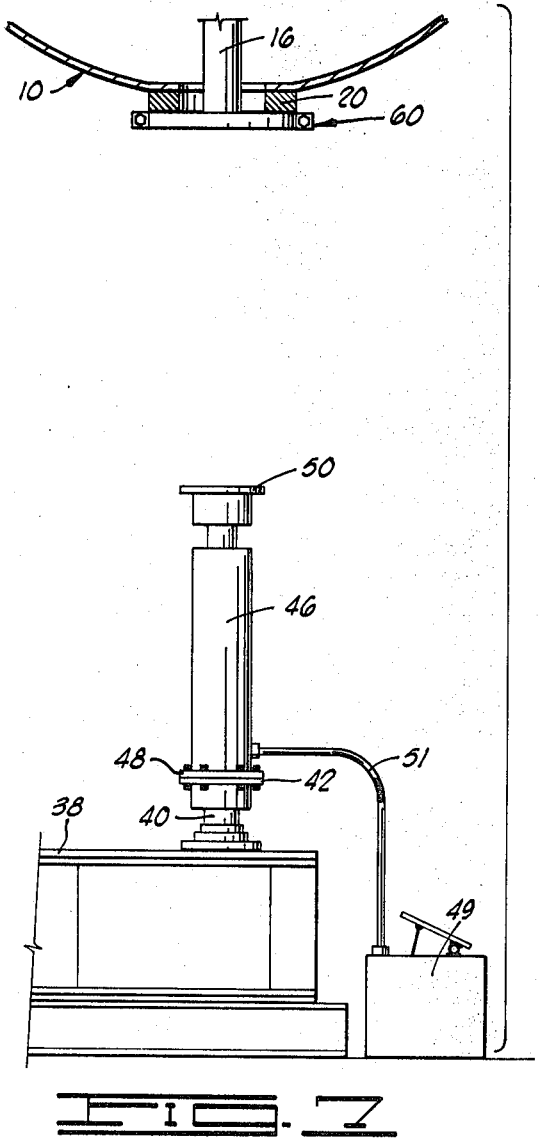

METHOD OF REMOVING AND REINSTALLING BOTTOM ENTERING AGITATOR SEALS

BACKGROUND OF THE INVENTION

1. Field of the Invention

The present invention relates to improved methods for removing and reinstalling bottom entering agitator seals, and more particularly, but not by way of limitation, to a method of removing and reinstalling a seal unit from a process vessel bottom entering agitator assembly wherein a jack is connected in the assembly to facilitate the removal of the seal unit.

2. Description of the Prior Art

Process vessels are commonly utilized in refineries, chemical plants and the like which include internal agitators. In a number of such vessels, the agitator within the vessel is driven by a vertical shaft which extends through an opening at the bottom of the vessel. A seal unit is provided connected to the vessel which prevents reactants or other fluids within the vessel from leaking out of the vessel around the agitator drive shaft. The seal unit is connected to a coupling shaft which is in turn connected to a rotary drive means such as an electric motor operably connected to a right angle gear box.

The seal units of large agitator assemblies are heavy, i.e., they often weigh over a thousand pounds, and when it is necessary to repair or replace such units, the removal and reinstallation thereof has been very difficult. Heretofore, the procedure followed for removing the seal unit from a vertically positioned bottom entering agitator assembly has been to remove the coupling shaft extending between the seal unit and the rotary drive means and then to lower and raise the seal unit, agitator shaft and agitator attached thereto in order to secure the agitator and agitator shaft within the vessel and remove the seal unit therefrom using a forklift truck having a special platform attached to the forks. The platform is positioned under the seal unit and bolted to the bottom end thereof. Because the weight of the seal unit, agitator shaft and agitator is carried off center on the fork truck, the load on the fork truck is unstable and causes the seal unit to tip and bind on guide rods. This situation presents a serious safety hazard.

By the present invention an improved method of removing and reinstalling seal units in bottom entering agitator assemblies is provided whereby the use of a forklift truck and the hazards attendant thereto are obviated.

SUMMARY OF THE INVENTION

An improved method for removing and reinstalling a seal unit from a process vessel bottom entering agitator assembly. The agitator assembly includes an agitator positioned within the vessel, an agitator shaft connected to the agitator having a connector at the bottom end thereof adapted to be connected to a support collar which is in turn adapted to be connected to the process vessel, a seal unit having upper and lower seal unit shafts, the upper seal unit shaft being connected to the connector at the bottom end of the agitator shaft within the vessel and extending through a flanged opening in the vessel, the seal unit being positioned outside the vessel and connected to the flanged opening thereof and a coupling shaft connected to the lower seal unit shaft and to a rotary drive means. In removing the seal unit from the assembly, the coupling shaft is removed, the seal unit is disconnected from the vessel flanged opening, the seal unit, agitator shaft and agitator connected thereto are lowered whereby the connection between the upper seal unit shaft and the agitator shaft is moved to a position outside the vessel, a support collar is connected to the connector at the bottom end of the agitator shaft, the seal unit, agitator shaft and agitator are raised whereby the support collar is positioned adjacent the vessel, the support collar is connected to the vessel and then the upper seal unit shaft is disconnected from the agitator shaft whereby the seal unit is removed from the assembly. The seal unit is reinstalled in the assembly by carrying out the above steps in reverse order. By the present invention, a jack is connected to the bottom end of the lower seal unit shaft and to the rotary drive means after removing the coupling shaft from the assembly and the jack is used to lower and raise the seal unit, agitator shaft and agitator during the removal and reinstallation of the seal unit. The jack is then disconnected from the assembly and the coupling shaft reinstalled therein.

It is, therefore, a general object of the present invention to provide an improved method of removing and reinstalling bottom entering agitator seal units.

A further object of the present invention is the provision of an improved method of removing and reinstalling a seal unit from a vessel bottom entering agitator assembly whereby the use of a forklift truck and the hazards attendant thereto are obviated.

Yet a further object of the present invention is the provision of an improved method of removing and reinstalling a seal unit from a process vessel bottom entering agitator assembly which allows the seal unit, agitator shaft and agitator connected thereto to be lowered and raised in a controlled, safe manner.

Other objects and advantages of the invention will be readily apparent to those skilled in the art upon a reading of the description of preferred embodiments which follows when taken in conjunction with the accompanying drawings.

BRIEF DESCRIPTION OF THE DRAWINGS

FIG. 2 illustrates the apparatus of FIG. 1 with hydraulic jack installed.

FIG. 3 is similar to FIG. 2 but illustrates the apparatus in a lowered position with a support collar attached to the agitator shaft.

FIG. 4 is a closeup illustration of the guide rods and support collar of FIG. 3.

FIG. 5 is a cross-sectional view taken along line 5—5 of FIG. 4.

FIG. 6 is a view similar to FIG. 2 showing the assembly in a lowered position with the seal unit removed therefrom.

FIG. 7 is an illustration showing the assembly with the seal unit removed.

DESCRIPTION OF PREFERRED EMBODIMENTS

Figure 1:
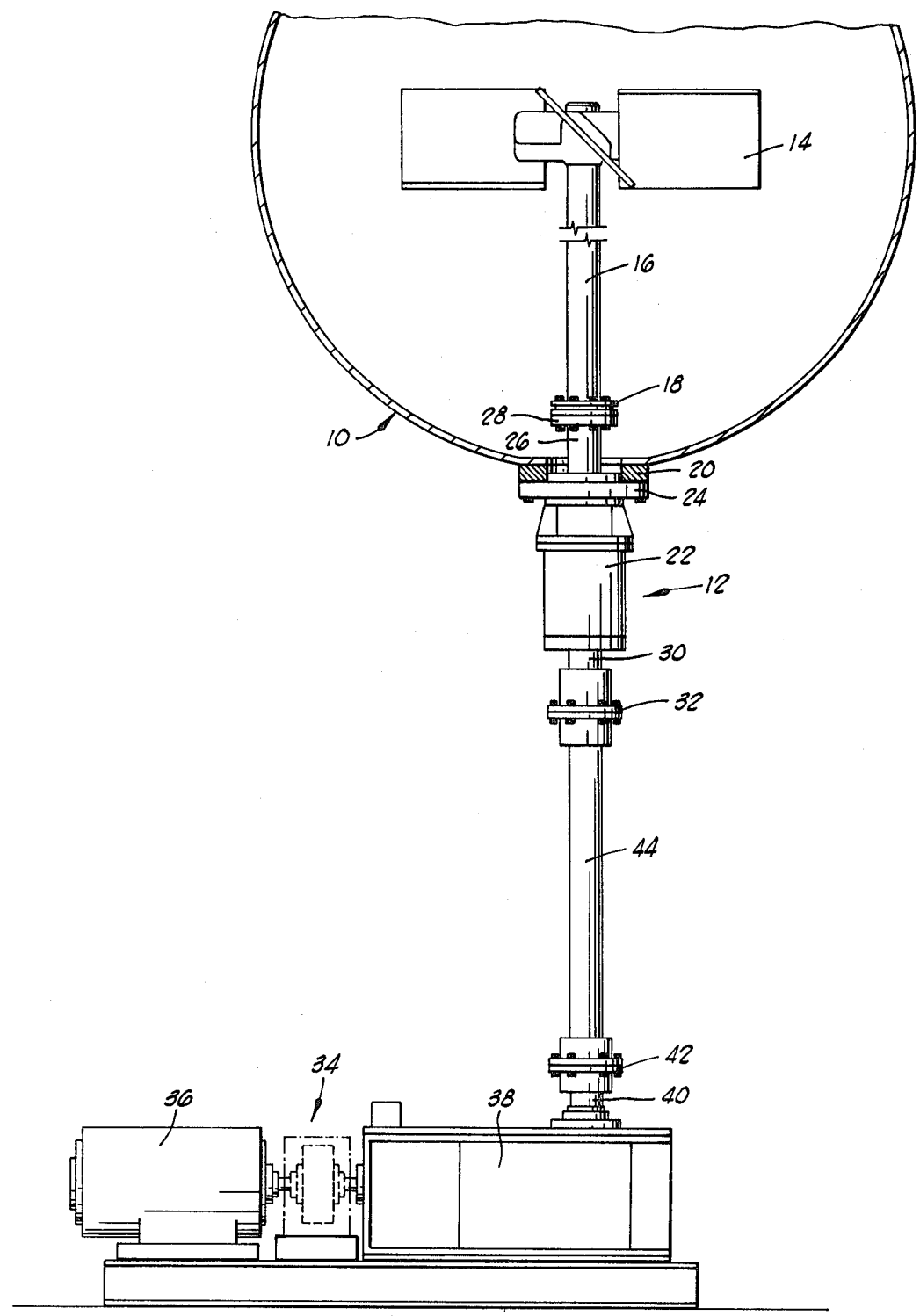
FIG. 1 is a vertical, partially sectional view of a process vessel having a bottom entering agitator assembly attached thereto.

Referring now to the drawings, and particularly to FIG. 1, a process vessel 10 having a bottom entering agitator assembly generally designated by the numeral 12 disposed therein and connected thereto is illustrated. The bottom entering agitator assembly 12 is comprised of an agitator 14 positioned within the vessel 10 having a vertically positioned agitator shaft 16 attached thereto. The bottom end of the agitator shaft 16 includes a connector 18 which can take various forms such as a flange having bolt holes formed therein for bolted connection to a complementary flange or other conventional shaft connector means. In addition, as will be described further hereinbelow, the connector 18 includes provision for the clamping of a support collar thereto during the removal and reinstallation of the seal unit in the assembly 12.

The vessel 10 includes a flanged opening at the bottom thereof and a conventional seal unit 22 is bolted to the flanged opening 20 in a conventional manner. The seal unit 22 can take various conventional forms and functions to provide a seal between the inside of the vessel 10 and a rotary shaft extending through the seal unit. The seal unit 22 includes a flange 24 at the upper end thereof for bolted connection to the flange 20 of the vessel 10 and an upper seal unit shaft 26 extending into the vessel 10. The upper seal unit shaft 26 includes a flange or other connector 28 at its upper end for connection to the connector 18 of the agitator shaft 16. A lower seal unit shaft 30 extends downwardly from the bottom of the seal unit 22 which includes a flange or other connector 32 at its lower end.

A conventional rotary drive means, generally designated by the numeral 34 is provided which can take various forms. In the form illustrated in FIG. 1, the rotary drive means 34 is comprised of an electric motor 36 connected to a right angle gear box 38. The gear box 38 includes an upwardly extending drive shaft 40 having a connector 42 attached thereto. A coupling shaft 44 is connected between the connector 42 of the shaft 40 and the connector 32 of the lower seal unit shaft 30.

In operation of the agitator assembly, the electric motor 36 causes the shaft 40 of the gear box to rotate which in turn rotates the coupling shaft 44 and the lower and upper seal unit shafts 30 and 26 of the seal unit 22. The rotation of the shaft 26 rotates the agitator shaft 16 which in turn causes the agitator 14 to rotate.

As mentioned above, from time to time the seal unit 22 must be removed from the agitator assembly 12 for repair and then reinstalled in the assembly. In removing the seal unit 22 in accordance with the present invention, the coupling shaft 44 is first removed from the assembly and a jack 46 is connected between the connector 42 of the shaft 40 and the connector 32 of the lower seal unit shaft 30. The jack 46 can take various forms, but is preferably provided with connectors 48 and 50 which mate with the connectors 42 and 32 and can be rigidly connected thereto. While the jack 46 can be of a mechanical type, it is preferably a conventional hand operated hydraulic jack.

After the jack 46 has been installed in the assembly 12 as illustrated in FIG. 2, two or more guide rods 52 and 54 are installed vertically in threaded bores provided in the flange 20 of the vessel 10. The guide rods 52 and 54 pass through apertures provided in the seal unit flange 24 and through guide clips 56 and 58 attached to the seal unit 22.

The bolts clamping the seal unit flange 24 to the flange 20 of the vessel 10 are next removed, and as shown in FIG. 3, the seal unit 22, the agitator shaft 16 and the agitator 14 connected thereto are lowered by lowering the jack 46. When lowered, the seal unit 22 slides downwardly on the guide rods 52 and 54 which prevent the seal unit 22 from tilting. Upon being lowered to a position whereby the connection between the agitator shaft 16 and upper seal unit shaft 26 is outside the vessel 10, a support collar 60 is attached to the connector 18 of the agitator shaft 16.

As best shown in FIG. 4, the support collar is comprised of two semi-annular parts 62 and 64 which bolt together by means of a pair of bolts 80 to form an annular flange. The parts 62 and 64 each include inwardly extending annular tongues 66 and 68 which are sized to engage an annular groove 70 provided in the connector 18 of the agitator shaft 16. The semi-annular parts 62 and 64 also include semicircular recesses in adjacent ends thereof whereby when fitted together as shown in FIG. 4, holes 72 and 74 are provided through which the guide rods 52 and 54 extend. A pair of bolt holes 76 are also provided in each of the parts 62 and 64 which align with bolt holes in the flange 20 of the vessel 10.

After the support collar 60 has been clamped onto the connector 18 of the agitator shaft 16, the seal unit 22, agitator shaft 16 an agitator 14 connected thereto are raised by operating the jack 46 to the position shown in FIG. 5, i.e., whereby the support collar 60 is positioned adjacent the flange 20 of the vessel 10. The support collar 60 is bolted to the flange 20 after which the connector 28 of the upper seal unit shaft 26 is disconnected from the connector 18 of the agitator shaft 16. The jack 46 is then again lowered so that the seal unit 22 is moved downwardly away from the connector 18 of the agitator shaft 16. The guide rods 52 and 54 are removed and the seal unit is removed from the jack 46 as shown in FIG. 6. As will be understood, the support collar 60 holds the agitator shaft 16 and agitator 14 connected thereto within the vessel 10 while the seal unit 22 is removed from the assembly 12 and while it is being repaired.

When the seal unit 22 is reinstalled in the assembly 12, it is again connected to the jack 46 whereby the procedure described above can be carried out in reverse order. That is, the seal unit 22 is raised whereby the upper seal unit shaft 26 can be connected to the agitator shaft 16. The seal unit 22, agitator shaft 16 and agitator 14 are then lowered and the support collar 60 removed from the connector 18. The seal unit 22, agitator shaft 16 an agitator 14 are then raised to position the flange 24 of the seal unit 22 adjacent the flange 20 of the vessel 10 and the flange 24 is bolted to the flange 20. The guide rods 52 and 54 are removed and the jack 46 is removed followed by the connection of the coupling shaft 44 in the assembly 12.

Thus, by the present invention, the jack 46 is utilized for lowering and raising the seal unit 22 and because the jack 46 is rigidly bolted into the assembly, such lowering and raising can be conducted safely without tilting the seal unit, etc. Thus, the present invention is well adapted to carry out the objects and attain the ends and advantages mentioned as well as those inherent therein. While numerous changes can be made by those skilled in the art, such changes are encompassed within the spirit of this invention as defined by the appended claims.

The embodiments of the invention in which an exclusive property of privilege is claimed are defined as follows:

1. In a method of removing and reinstalling a seal unit from a process vessel bottom entering agitator assembly wherein the assembly includes an agitator positioned within the vessel, an agitator shaft connected to the agitator having a connector at the bottom end thereof adapted to be connected to a support collar which is in turn adapted to be connected to the vessel, a seal unit having upper and lower seal unit shafts, the upper seal unit shaft being connected to the connector at the bottom end of the agitator shaft within the vessel and extending through a flanged opening in the vessel, the seal unit being positioned outside the vessel and connected to the flanged opening in the vessel and a coupling shaft connected to the bottom end of the lower seal unit shaft and to a rotary drive means, wherein the seal unit is removed by removing the coupling shaft from the assembly, disconnecting the seal unit from the flanged opening of the vessel, lowering the seal unit, agitator shaft and agitator connected thereto whereby the connection between the upper seal unit shaft and the agitator shaft is moved to a position outside the vessel, connecting the support collar to the connector at the bottom end of the agitator shaft, raising the seal unit, agitator shaft and agitator whereby the support collar is positioned adjacent the vessel, connecting the support collar to the vessel and then disconnecting the upper seal unit shaft from the agitator shaft whereby the seal unit is removed from the assembly and wherein the seal unit is reinstalled by carrying out the above steps in reverse order, the improvement which comprises:

connecting a jack to the bottom end of said lower seal unit shaft and to the rotary drive means after removing said coupling shaft from said assembly;

using said jack to lower and raise said seal unit, agitator shaft and agitator during the removal and reinstallation of said seal unit;

disconnecting said jack from said assembly; and then reinstalling said coupling shaft in said assembly.

2. The method of claim 1 wherein said support collar includes bolt holes therein and is connected to said vessel by bolting said support collar to said flanged opening of said vessel.

3. The method of claim 2 wherein said jack is a hand operated hydraulic jack.

4. The method of claim 3 wherein the upper and lower ends of said jack are adapted for rigid direct connection to said lower seal unit shaft and to said rotary drive means.

* * * * *